United States Patent
Ishikawa et al.

(10) Patent No.: US 10,277,781 B2
(45) Date of Patent: Apr. 30, 2019

(54) IMAGE PROCESSING APPARATUS, IMAGE FORMING APPARATUS, AND NON-TRANSITORY COMPUTER READABLE MEDIUM

(71) Applicant: FUJI XEROX CO., LTD., Tokyo (JP)

(72) Inventors: Yurie Ishikawa, Kanagawa (JP); Noriko Arai, Kanagawa (JP); Kenji Ueda, Kanagawa (JP); Chihiro Matsuguma, Kanagawa (JP); Tatsuya Namiki, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/584,300

(22) Filed: May 2, 2017

(65) Prior Publication Data
US 2018/0077321 A1 Mar. 15, 2018

(30) Foreign Application Priority Data
Sep. 15, 2016 (JP) ................................. 2016-180911

(51) Int. Cl.
*H04N 1/60* (2006.01)
*G06K 9/46* (2006.01)
*H04N 1/21* (2006.01)
*H04N 1/393* (2006.01)

(52) U.S. Cl.
CPC ......... *H04N 1/6008* (2013.01); *G06K 9/4652* (2013.01); *H04N 1/2166* (2013.01); *H04N 1/3935* (2013.01); *H04N 1/6027* (2013.01)

(58) Field of Classification Search
CPC .................................................... H04N 1/6008
See application file for complete search history.

(56) References Cited

U.S. PATENT DOCUMENTS

| | | | | |
|---|---|---|---|---|
| 6,141,025 A * | 10/2000 | Oka | ........................ | G06T 1/20 345/531 |
| 6,518,981 B2 * | 2/2003 | Zhao | ...................... | H04N 1/644 345/589 |
| 6,992,783 B1 * | 1/2006 | Sumiuchi | .............. | G06T 11/001 358/1.15 |
| 2006/0153442 A1 * | 7/2006 | Song | ........................ | G06K 7/14 382/165 |
| 2012/0038659 A1 * | 2/2012 | Matsuguma | ........... | G06K 9/346 345/589 |

FOREIGN PATENT DOCUMENTS

JP 2009-187393 A 8/2009

\* cited by examiner

*Primary Examiner* — King Y Poon
(74) *Attorney, Agent, or Firm* — Oliff PLC (57) ABSTRACT

An image processing apparatus includes an extraction unit, a memory controller, and a transfer unit. The extraction unit extracts, on the basis of image information, pieces of color information having a high frequency of occurrence as color information that is necessary to perform image processing. The memory controller causes a first memory to store a color information group including the pieces of color information extracted by the extraction unit. The transfer unit transfers the color information group from the first memory to a second memory, an access time of the second memory being shorter than an access time of the first memory.

10 Claims, 9 Drawing Sheets

IMAGE PROCESSING APPARATUS, IMAGE FORMING APPARATUS, AND NON-TRANSITORY COMPUTER READABLE MEDIUM

CROSS-REFERENCE TO RELATED APPLICATIONS

This application is based on and claims priority under 35 USC 119 from Japanese Patent Application No. 2016-180911 filed Sep. 15, 2016.

BACKGROUND

(i) Technical Field

The present invention relates to an image processing apparatus, an image forming apparatus, and a non-transitory computer readable medium.

(ii) Related Art

In an image forming apparatus such as a copier or printer using an electrophotographic system, an inkjet system, or the like, various types of image processing may be performed on image information input thereto and then an image may be formed by an image forming unit. The image processing includes, for example, color conversion processing for converting image information into image information of colors reproduced by the image forming apparatus (for example, colors of toners as coloring materials: yellow (Y), magenta (M), cyan (C), and black (K)).

Color conversion processing may be performed by using, for example, a color conversion table. The color conversion table has a configuration in which output color data is associated with predetermined input color data called grid point data. For input color data that is not in the color conversion table, output color data is calculated based on grid point data of surrounding grid points, and thereby color conversion processing is performed.

SUMMARY

According to an aspect of the invention, there is provided an image processing apparatus including an extraction unit, a memory controller, and a transfer unit. The extraction unit extracts, on the basis of image information, pieces of color information having a high frequency of occurrence as color information that is necessary to perform image processing. The memory controller causes a first memory to store a color information group including the pieces of color information extracted by the extraction unit. The transfer unit transfers the color information group from the first memory to a second memory, an access time of the second memory being shorter than an access time of the first memory.

BRIEF DESCRIPTION OF THE DRAWINGS

An exemplary embodiment of the present invention will be described in detail based on the following figures, wherein.

DETAILED DESCRIPTION

Description of Overall Configuration of Image Forming Apparatus

Hereinafter, an exemplary embodiment of the present invention will be described in detail with reference to the attached drawings.

Figure 1:
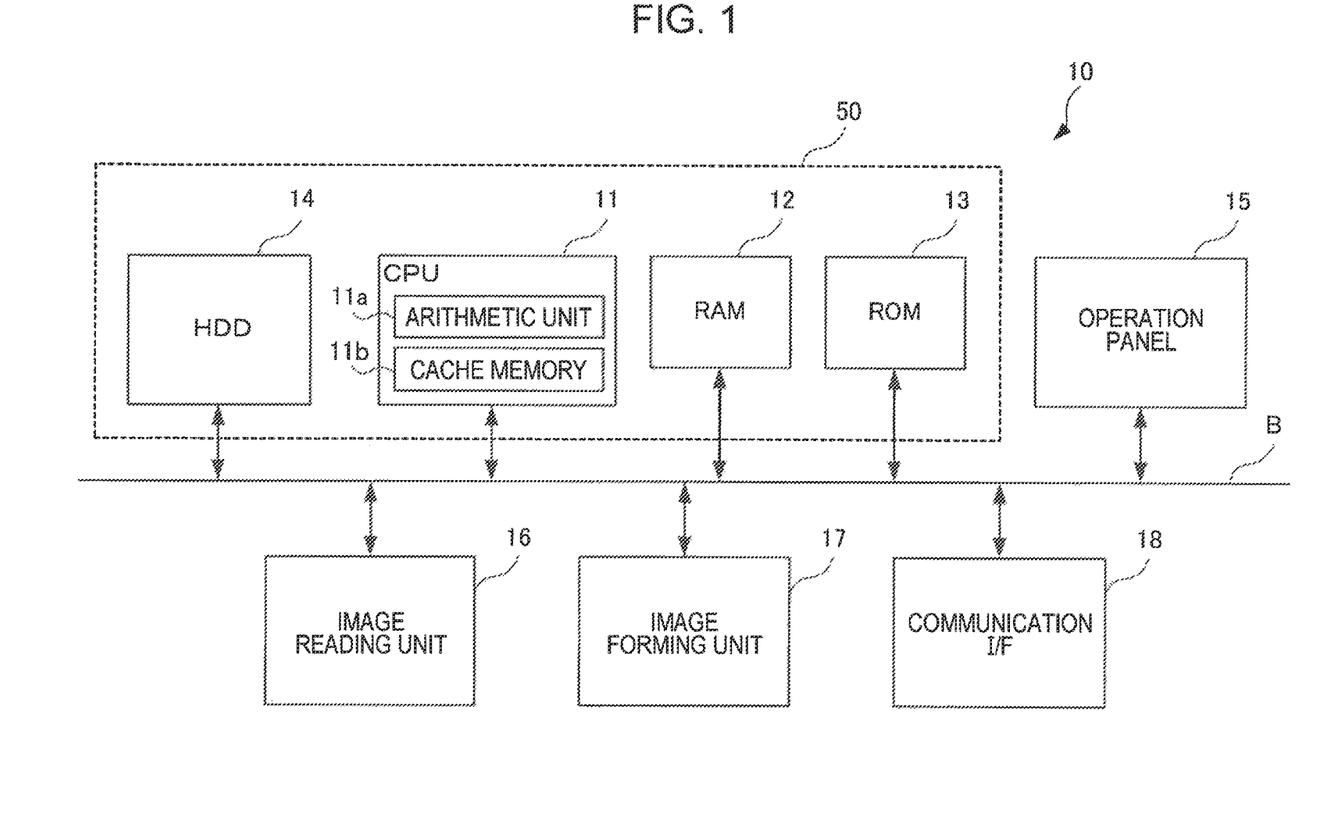
FIG. 1 is a diagram illustrating an example hardware configuration of an image forming apparatus.

FIG. 1 is a diagram illustrating an example hardware configuration of an image forming apparatus 10.

As illustrated in FIG. 1, the image forming apparatus 10 includes a central processing unit (CPU) 11, a random access memory (RAM) 12, a read only memory (ROM) 13, a hard disk drive (HDD) 14, an operation panel 15, an image reading unit 16, an image forming unit 17, and a communication interface (I/F) 18. These components transmit and receive necessary data through a bus B.

The CPU 11 loads various programs stored in the ROM 13 or the like to the RAM 12 and executes the programs, thereby implementing individual functions described below.

The CPU 11 includes an arithmetic unit 11a and a cache memory 11b.

The arithmetic unit 11a performs operations such as logical operations and four fundamental operations of arithmetic. The cache memory 11b is an example of a second memory and is a high-speed memory that stores frequently used data.

The RAM 12 is a memory that is used as a working memory or the like of the CPU 11.

The RAM 12 is an example of a first memory and operates at a lower speed than the cache memory 11b serving as the second memory. That is, the access time of the cache memory 11b is shorter than that of the RAM 12. The capacity of the cache memory 11b is smaller than that of the RAM 12. In other words, the cache memory 11b operates at a higher speed than the RAM 12 but has a smaller capacity than the RAM 12. With the cache memory 11b being provided and frequently used data being stored therein, the frequency at which data is read from the slower RAM 12 decreases and the operation efficiency of the arithmetic unit 11a increases.

The ROM 13 is a memory that stores various programs executed by the CPU 11.

The HDD 14 is, for example, a magnetic disk device that stores image information read by the image reading unit 16 and image information to be used for image formation performed by the image forming unit 17.

The operation panel 15 is, for example, a touch panel that displays various pieces of information and receives an operation input from a user.

The image reading unit 16 reads an image recorded on a document. Here, the image reading unit 16 is, for example, a scanner. A scanner including a charge coupled device (CCD) system in which light emitted from a light source and reflected by a document is reduced by a lens and received by a CCD, or a scanner including a contact image sensor (CIS) system in which light beams sequentially emitted from an LED light source and reflected by a document are received by a CIS may be used.

The image forming unit 17 is an example of a printing mechanism that forms an image on a recording medium. Here, the image forming unit 17 is, for example, a printer. A printer including an electrophotographic system in which an image is formed by transferring toner adhered on a photoconductive body to a recording medium such as paper, or a printer including an inkjet system in which an image is formed by ejecting ink onto a recording medium may be used.

The communication I/F 18 transmits/receives various pieces of information to/from another apparatus through a network.

In this exemplary embodiment, the CPU 11, the RAM 12, the ROM 13, and the HDD 14 constitute a controller 50 that controls the individual mechanism units of the image forming apparatus 10. Although the details will be described below, the controller 50 functions as an example of an image processing apparatus (image processing unit) that performs image processing on image information that is to be used for forming an image by the image forming unit 17.

Description of Signal Processing System

Figure 2:
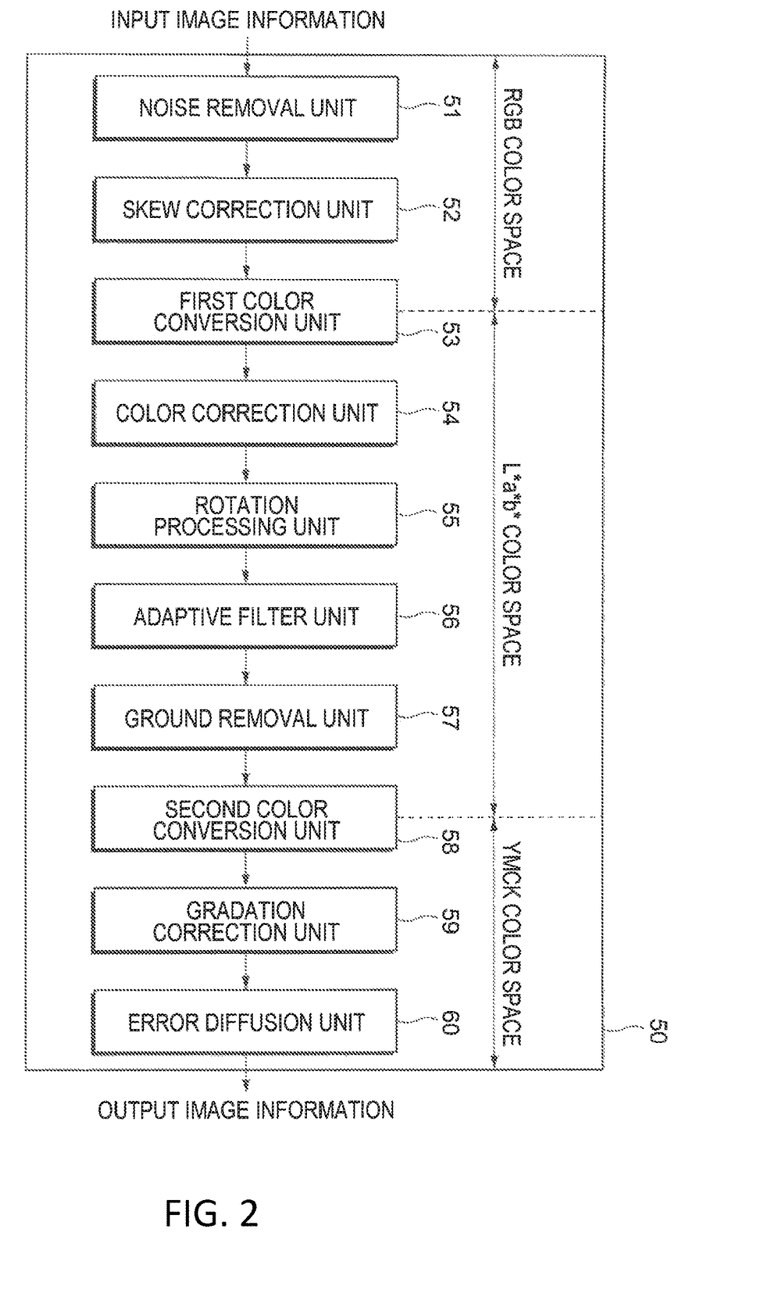
FIG. 2 is a diagram illustrating a signal processing system in a controller of the image forming apparatus.

FIG. 2 is a diagram illustrating a signal processing system in the controller 50 of the image forming apparatus 10.

FIG. 2 illustrates an example in which the image forming apparatus 10 is configured as a printer. Hereinafter, a description will be given of a flow of image signal processing with reference to FIG. 2.

The controller 50 includes a noise removal unit 51, a skew correction unit 52, a first color conversion unit 53, a color correction unit 54, a rotation processing unit 55, an adaptive filter unit 56, a ground removal unit 57, a second color conversion unit 58, a gradation correction unit 59, and an error diffusion unit 60.

The noise removal unit 51 removes noise from input image information. The noise results from, for example, dust or the like on the image reading unit 16. In this case, if an image of a document is read by the image reading unit 16, a thread-like noise occurs in a sub-scanning direction due to the dust. The noise removal unit 51 detects and removes the noise.

Here, the input image information is RGB data composed of red (R) data, green (G) data, and blue (B) data, and is color data in the RGB color space.

The skew correction unit 52 corrects a skew of a document. For example, the skew correction unit 52 detects an edge portion of a document, detects a skew angle on the basis of the detected edge portion, and performs skew correction.

The first color conversion unit 53 converts RGB data in the RGB color space into L*a*b* data in the L*a*b* color space. The first color conversion unit 53 performs color conversion by using a Direct Look Up Table (DLUT), which is a multidimensional color conversion table, or a one-dimensional Look Up Table (LUT).

The color correction unit 54 performs color correction on the L*a*b* data.

In the image reading unit 16, chronological fluctuation of individual parts or variations in components causes color variation (color fluctuation). Thus, the color correction unit 54 performs color correction by using the DLUT or one-dimensional LUT in order to adjust the color fluctuation.

The rotation processing unit 55 performs processing of rotating an image on the basis of image information. For example, if the orientation in the long-side direction and short-side direction of a document to be read does not match that of a recording medium, the rotation processing unit 55 rotates an image so that the orientations of the document and the recording medium match.

The adaptive filter unit 56 performs processing of emphasizing an edge in a character region of an image and performs smoothing processing in an image region.

The ground removal unit 57 performs processing of detecting a color of a ground of an image and removing the color. That is, the ground removal unit 57 performs processing of detecting a ground color of a document and removing the ground color.

The second color conversion unit 58 converts the L*a*b* data in the L*a*b* color space into YMCK data having colors reproduced by the image forming apparatus 10 (the colors of toners as coloring materials: yellow (Y), magenta (M), cyan (C), and black (K)) and outputs the YMCK data. The YMCK data is formed of Y data, M data, C data, and K data that are separated by color. The second color conversion unit 58 performs color conversion by using a DLUT, which is a multidimensional color conversion table. The details of the second color conversion unit 58 will be described below.

The gradation correction unit 59 performs gradation correction on each color of YMCK by using gradation correction information. The gradation correction information is in the form of a LUT, which is a one-dimensional table.

The error diffusion unit 60 performs screen processing on image information by performing error diffusion processing using a predetermined error diffusion pattern. Accordingly, the image information is converted from multivalued image information (multivalued image data) represented by multiple values into binary image information (binary image data) represented by two values.

The error diffusion unit 60 outputs, as output image information, binary image information for each color of YMCK.

Description of DLUT

The second color conversion unit 58 converts L*a*b* data into YMCK data by using a DLUT, which is a multi-dimensional color conversion table described above.

Figure 3:
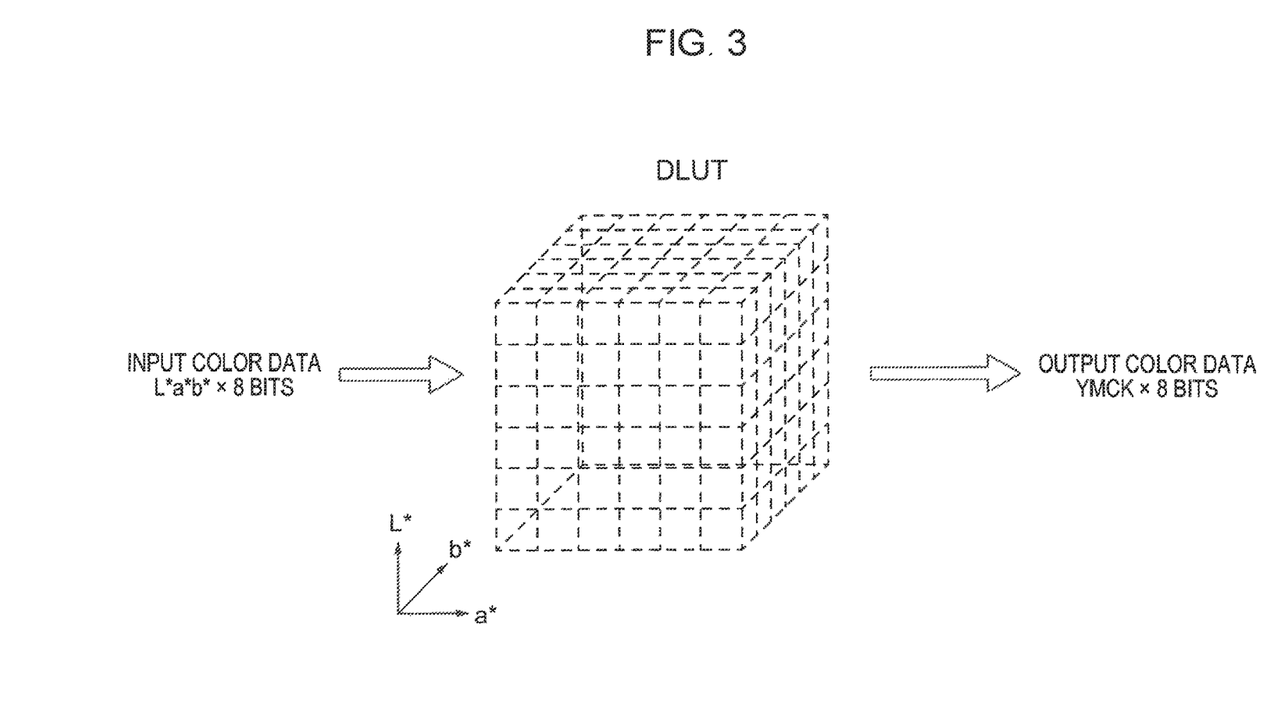
FIG. 3 is a conceptual diagram illustrating a state where L*a*b* data is converted into YMCK data by using a DLUT.

FIG. 3 is a conceptual diagram illustrating a state where L*a*b* data is converted into YMCK data by using the DLUT.

Use of the DLUT enables accurate conversion even if L*a*b* data and YMCK data have a nonlinear relationship.

According to a method for performing color conversion by using the DLUT, representative pixel values are selected for each of L*, a*, and b*. For example, if the data of each of L*, a*, and b* is represented by 8-bit gradation, the pixel values are integers of 0 to 255. These integers are divided into sixteen groups, and seventeen values including 0, 16, 32, 48, 64, 80, 96, 112, 128, 144, 160, 176, 192, 208, 224, 240, and 255 are selected as representative pixel values, for example. The components of L*a*b* data representable by these pixel values are regarded as grid points (in this case, the number of grid points is 17^3=4913), and YMCK data is associated with the individual grid points. The correspondence between the YMCK data and the individual grid points represented by a LUT is a DLUT. In the YMCK data, the data of each of Y, M, C, and K has pixel values that are integers of 0 to 255, as in the L*a*b* data.

In this case, the YMCK data for intermediate colors other than the components of L*a*b* data corresponding to the grip points is calculated by using linear interpolation. Specifically, 8-point interpolation may be used in which linear interpolation is performed by using grid point data at eight grid points around the L*a*b* data to be converted and thereby YMCK data is obtained. Alternatively, 6-point interpolation in which linear interpolation is performed by using grid point data at surrounding six grid points or 4-point interpolation in which linear interpolation is performed by using grid point data at surrounding four grid points may be used.

Figure 4:
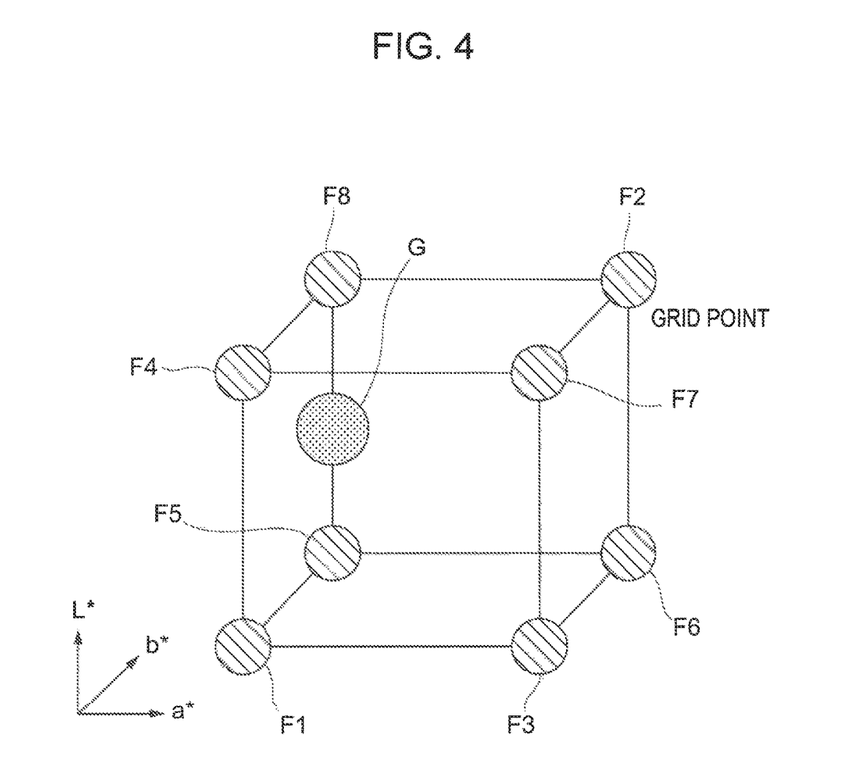
FIG. 4 is a diagram illustrating eight grid points used in 8-point interpolation.

FIG. 4 is a diagram illustrating eight grid points used in 8-point interpolation.

FIG. 4 illustrates a case where the L*a*b* data of one pixel G is plotted in the L*a*b* color space. In this case, the grid point data used to perform color conversion on the pixel G is grid point data at eight grid points existing around the pixel G. The eight grid points are denoted by F1 to F8 in FIG. 4.

FIGS. 5A to 5G are diagrams illustrating four grid points used in 4-point interpolation.

Figure 5A:
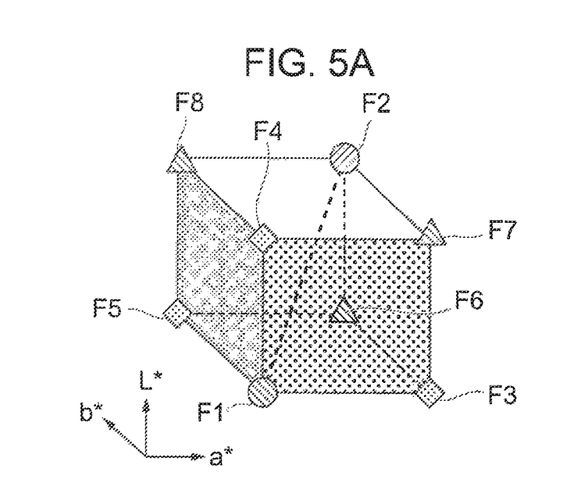
FIGS. 5A to 5G are diagrams illustrating four grid points used in 4-point interpolation.
Figure 5B:
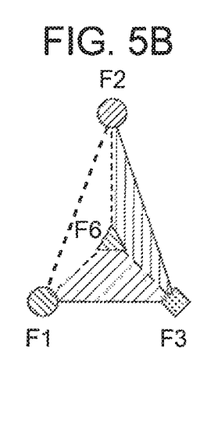
Figure 5C:
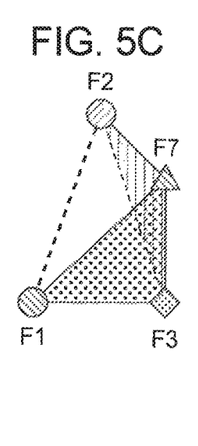
Figure 5D:
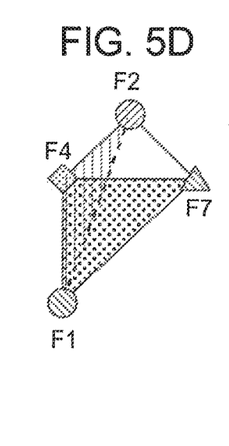
Figure 5E:
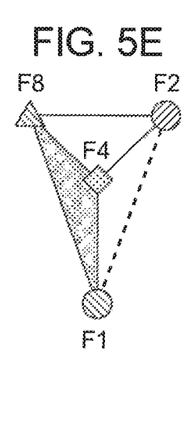
Figure 5F:
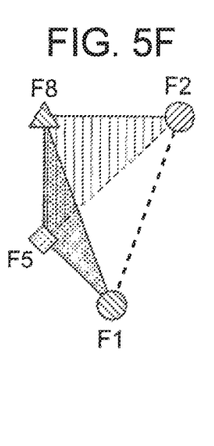
Figure 5G:
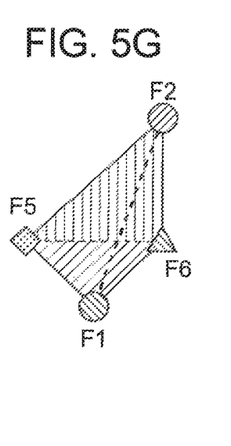

Among these figures, FIG. 5A is a figure illustrating eight grid points F1 to F8, like FIG. 4.

A triangular pyramid including four grid points among the grid points F1 to F8 is discussed. In this case, six types of triangular pyramids illustrated in FIGS. 5B to 5G may be formed, and the pixel G is included in any one of the six types of triangular pyramids. Thus, linear interpolation may be performed by using the grid point data at four grid points included in the triangular pyramid including the pixel G.

In general, color conversion processing is performed at higher speed as the number of grid points used to perform linear interpolation decreases.

Description of Second Color Conversion Unit 58

A detailed description will further be given of the second color conversion unit 58 according to the exemplary embodiment.

Figure 6:
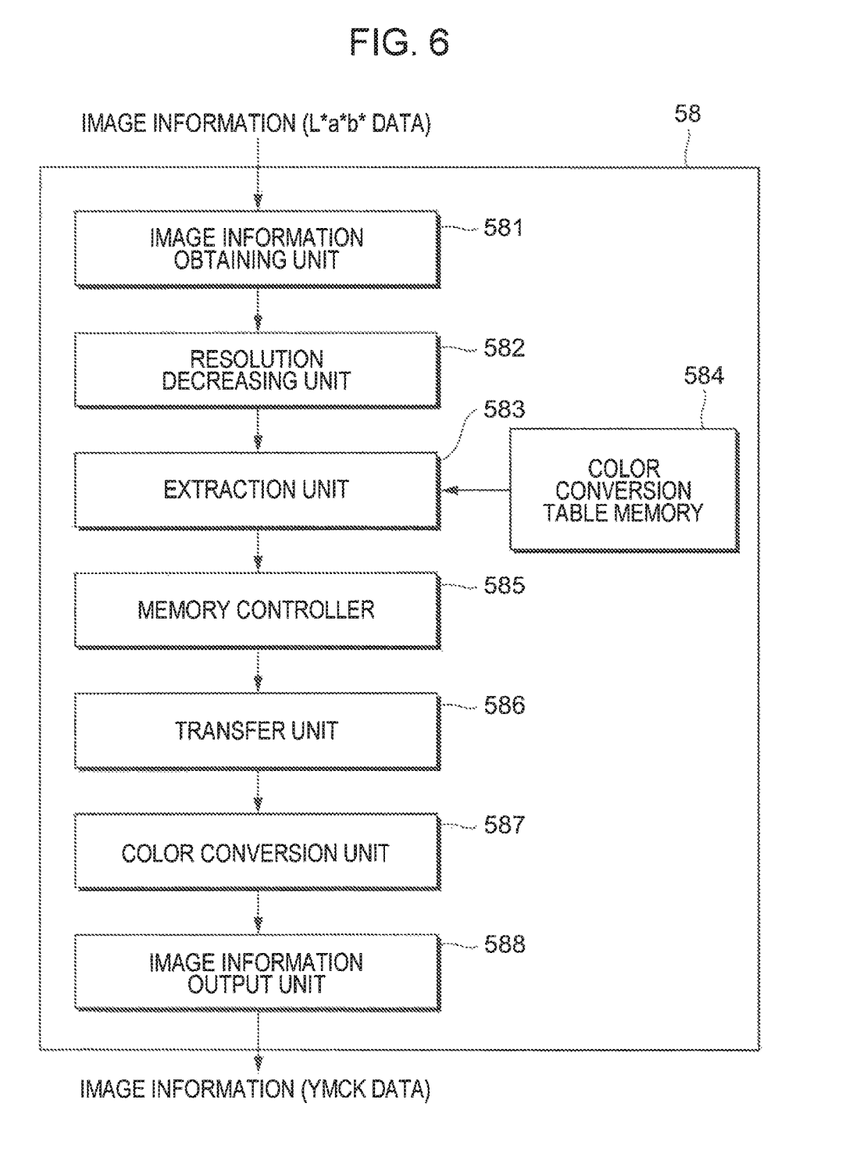
FIG. 6 is a block diagram illustrating an example functional configuration of a second color conversion unit.

FIG. 6 is a block diagram illustrating an example functional configuration of the second color conversion unit 58.

As illustrated in FIG. 6, the second color conversion unit 58 includes an image information obtaining unit 581, a resolution decreasing unit 582, an extraction unit 583, a color conversion table memory 584, a memory controller 585, a transfer unit 586, a color conversion unit 587, and an image information output unit 588.

The image information obtaining unit 581 obtains image information that has been processed by the ground removal unit 57. The image information is formed of L*a*b* data.

The resolution decreasing unit 582 decreases the resolution of image information.

Figure 7:
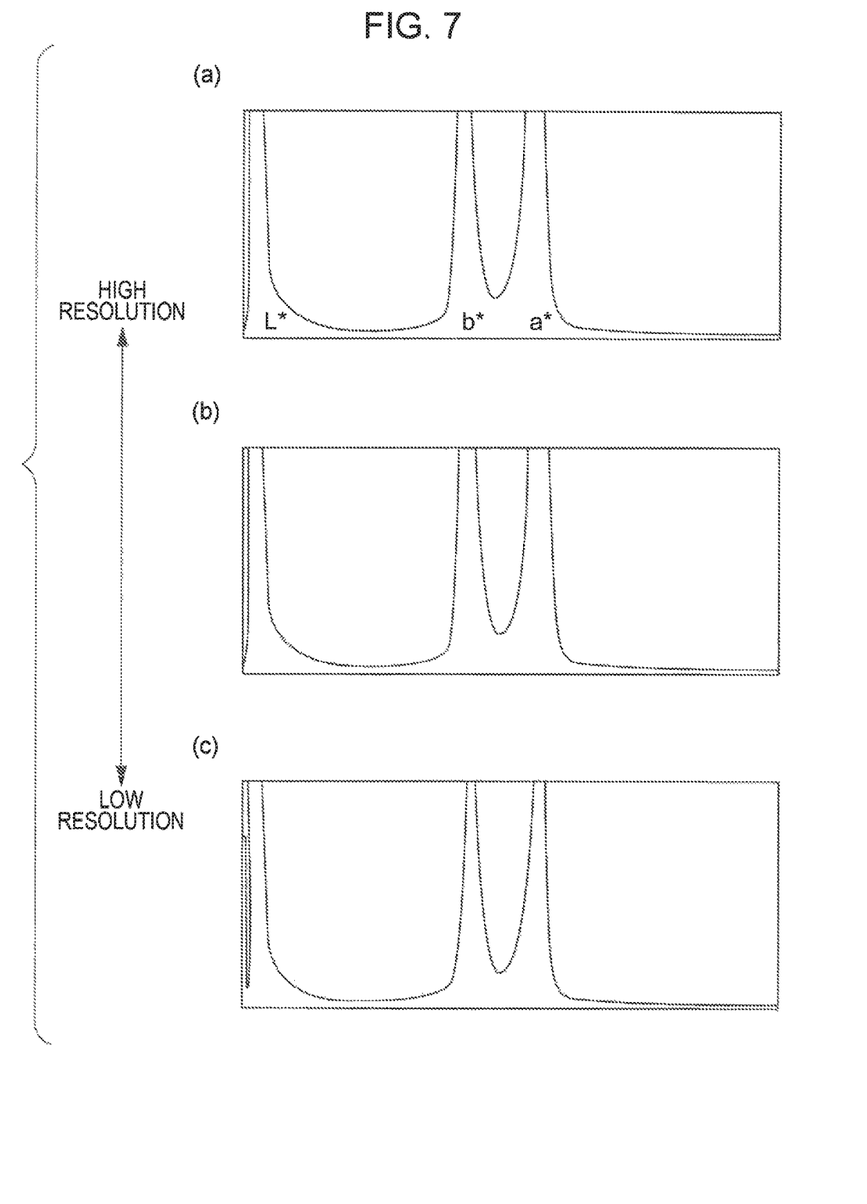
FIG. 7 is a diagram illustrating histograms (a) to (c) of image information.

FIG. 7 is a diagram illustrating histograms (a) to (c) of image information. In FIG. 7, a histogram obtained from high-resolution image information that has not been subjected to a process of decreasing resolution is compared with a histogram obtained from image information that has been subjected to a process of decreasing resolution.

Among these histograms, histogram (a) is a histogram of high-resolution image information that has not been subjected to a process of decreasing resolution. Histogram (c) is a histogram of low-resolution image information that has been subjected to a process of decreasing resolution. Histogram (b) is a histogram of intermediate-resolution image information having a resolution between the resolution in histogram (a) and the resolution in histogram (c). The process of decreasing resolution of image information may be performed by using a method according to the related art. For example, the process may be performed by averaging input color data or thinning input color data.

In histograms (a) to (c) in FIG. 7, the horizontal axis represents the pixel value of each of L* data, a* data, and b*data, which is any one of integers of 0 to 255. The vertical axis represents the frequency (the number of pixels). In this case, each of histograms (a) to (c) illustrated in FIG. 7 is obtained by superimposing the histograms of L* data, a* data, and b* data.

In the histograms of image information illustrated as examples, each of L* data, a* data, and b* data has one peak. The positions of the peaks are the same among histograms (a) to (c). If this is considered from the viewpoint of the relationship between image information and grid point data, the grid point data existing around the image information is the same even if the resolution varies. That is, the grid point data used for color conversion processing remains the same even if the resolution of the image information is decreased.

Thus, in the exemplary embodiment, the speed of extracting color information by the extraction unit 583 is increased by decreasing the resolution of image information.

The extraction unit 583 extracts, on the basis of image information, color information having a high frequency of occurrence as color information that is necessary to perform image processing. In this case, the image information is image information whose resolution has been decreased by the resolution decreasing unit 582. The image processing is color conversion processing. The color information that is necessary to perform image processing is grid point data in a conversion table used for color conversion processing. That is, the extraction unit 583 extracts, on the basis of image information, grid point data having a high frequency of occurrence as grid point data to be used for color conversion processing. The grid point data is stored in the color conversion table memory 584. The extraction unit 583 is able to obtain the grid point data by referring to the color conversion table memory 584.

The extraction unit 583 counts, for each grid point, the number of times each pixel refers to the grid point at the time of color conversion processing, on the basis of the pixel value (L*, a*, b*) of each pixel included in the image information. The grid point data at the grid point that is referred to a larger number of times is grid point data having a higher frequency of occurrence. Here, a grid point that is referred to a larger number of times is selected, and the grid point data at the grid point is extracted as grid point data having a higher frequency of occurrence. The number of grid points to be selected may be one, or plural grid points may be selected in order of frequency of occurrence.

The extraction unit 583 further extracts a color information group including the extracted color information. In this case, one or more selected grid points and grid points around the selected grid points are selected, and the pieces of grid point data at these grid points are regarded as a color information group. In this case, the color information group may include the extracted pieces of grid point data and the pieces of grid point data whose lightness has been changed.

Figure 8A:
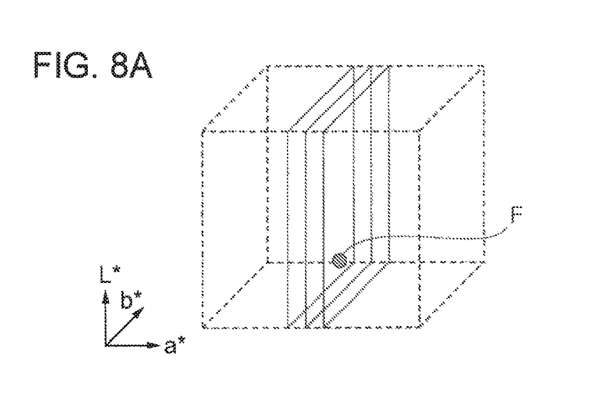
FIGS. 8A to 8C are diagrams for describing a method for extracting a color information group.
Figure 8B:
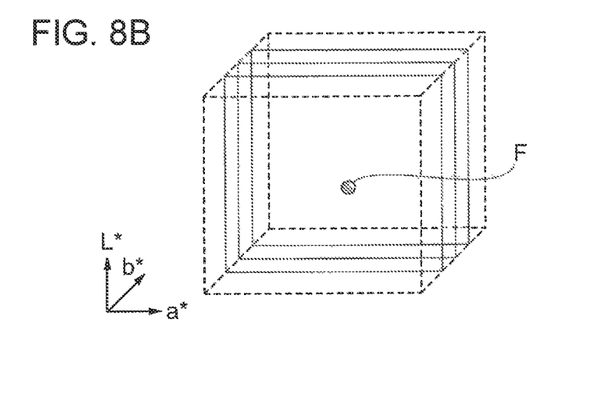
Figure 8C:
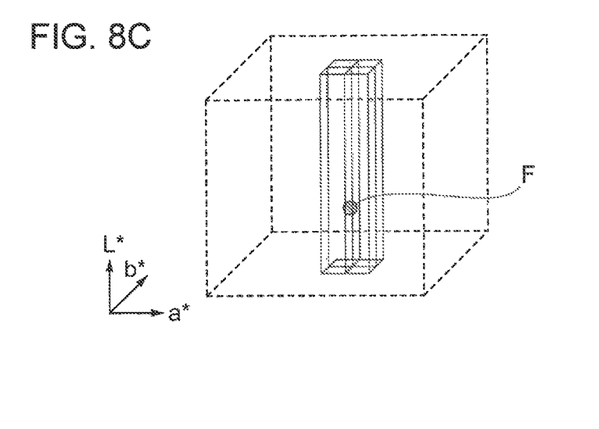

FIGS. 8A to 8C are diagrams for describing a method for extracting a color information group.

In FIGS. 8A to 8C, a grid point F is a point selected as a grid point that is referred to a larger number of times. The grid point F is located at the illustrated position in the L*a*b* color space.

In FIG. 8A, two grid points adjacent to the grid point F in the a* direction are extracted, and also the grid points that are the same as these three grid points in L* or b* are extracted. That is, as illustrated in FIG. 8A, grid points in the thickness corresponding to three grid points in the a* direction along the L*b* plane are extracted. In this case, the number of extracted grid points is 17×17×3=867. The pieces of grid point data at these grid points serve as a color information group. That is, in this case, the color information group is formed of 867 pieces of grid point data.

In FIG. 8B, two grid points adjacent to the grid point F in the b* direction are extracted, and also the grid points that are the same as these three grid points in L* or a* are extracted. That is, as illustrated in FIG. 8B, grid points in the thickness corresponding to three grid points in the b* direction along the L*a* plane are extracted. In this case, the color information group is formed of 867 pieces of grid point data, as in the case of FIG. 8A.

In FIG. 8C, two grid points adjacent to the grid point F in both the a* direction and the b* direction are extracted, and also the grid points that are the same as these three grid points in L* are extracted. That is, as illustrated in FIG. 8C, 3×3=9 grid points on the a*b* plane are extracted, and all the 9 grid points along the L* direction are extracted. In this case, the number of extracted grid points is 3×3×17=153. The pieces of grid point data at these grid points serve as a color information group. That is, in this case, the color information group is formed of 153 pieces of grid point data.

The color information group extracted in each of FIGS. 8A to 8C is formed of extracted pieces of grid point data and the pieces of grid point data whose lightness has been changed. A typical document is often a combination of a nearly white background and black characters. Thus, if the extracted pieces of grid point data are nearly white, there is a high possibility that grid points having low lightness (nearly black) with the same hue will also be referred to. Thus, pieces of grid point data having lightness different from the extracted pieces of grid point data are likely to be used in color conversion processing. For this reason, these pieces of grid point data are extracted.

Referring back to FIG. 6, the memory controller 585 causes the RAM 12, which is the first memory, to store the color information group including the pieces of color information extracted by the extraction unit 583. The memory controller 585 may rearrange the pieces of color information included in the color information group in order of lightness and store the color information group in the RAM 12.

The transfer unit 586 transfers the color information group from the RAM 12 (first memory) to the cache memory 11b (second memory) whose access time is shorter than that of the RAM 12. In this case, if the pieces of color information included in the color information group are rearranged in order of lightness by the memory controller 585, burst transfer is usable when the pieces of grid point data are transferred from the RAM 12 to the cache memory 11b. If the pieces of color information included in the color information group are rearranged in order of lightness, it is not necessary to designate an address for each piece of data, and accordingly a data transfer speed is increased. That is, the pieces of data may be sequentially transferred only by outputting an address once at the beginning. The cache memory 11b (second memory) stores correspondence information representing the correspondence between the pieces of grid point data included in the color information group and address information representing the addresses at which the individual pieces of grid point data are stored. Accordingly, the location where the pieces of grid point data are stored may be grasped when the color conversion unit 587 performs color conversion processing.

The color conversion unit 587 performs color conversion on the image data obtained by the image information obtaining unit 581. Here, L*a*b* data is converted into YMCK data by using a DLUT, which is a color conversion table, as described above. In this case, color conversion is performed by referring to the grid point data transferred to the cache memory 11b by the transfer unit 586.

The image information output unit 588 outputs the YMCK data, which is image information that has been subjected to color conversion, to the gradation correction unit 59.

Next, an operation of the second color conversion unit 58 will be described.

Figure 9:
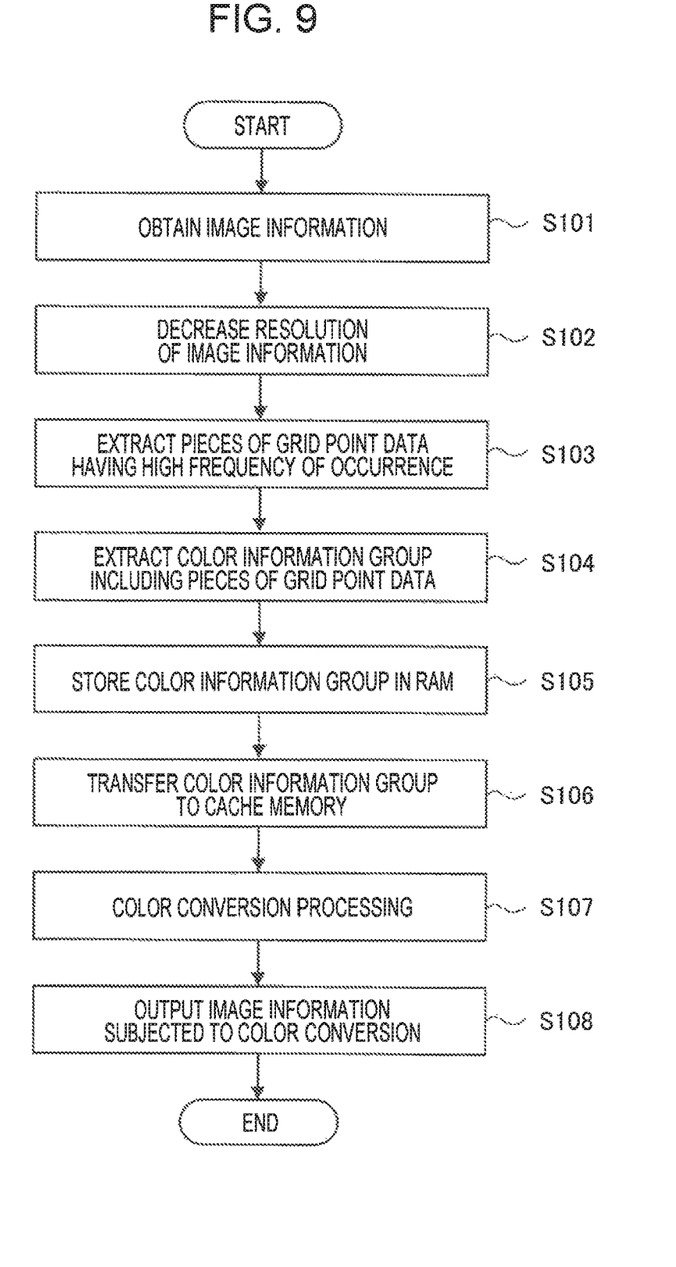
FIG. 9 is a flowchart for describing an operation of the second color conversion unit.

FIG. 9 is a flowchart for describing the operation of the second color conversion unit 58.

First, the image information obtaining unit 581 obtains image information that has been processed by the ground removal unit 57 (step S101). The image information is formed of L*a*b* data.

Subsequently, the resolution decreasing unit 582 decreases the resolution of the obtained image information (step S102).

The extraction unit 583 extracts, on the basis of the image information whose resolution has been decreased, pieces of grid point data having a high frequency of occurrence among pieces of grid point data that are necessary to perform color conversion processing (step S103).

The extraction unit 583 further extracts a color information group including the extracted pieces of grid point data (step S104). In this case, one or more selected grid points and grid points located around the selected grid points are selected, and the pieces of grid point data at these grid points are regarded as a color information group. The color information group includes, for example, as illustrated in FIGS. 8A and 8B, the extracted pieces of grid point data and the grid point data whose lightness has been changed.

Subsequently, the memory controller 585 causes the RAM 12, which is the first memory, to store the color information group extracted by the extraction unit 583 (step S105). At this time, the memory controller 585 rearranges the pieces of grid point data included in the color information group in order of lightness and then stores the color information group in the RAM 12.

Furthermore, the transfer unit 586 transfers the color information group from the RAM 12 (first memory) to the cache memory 11b (second memory) (step S106).

The color conversion unit 587 performs color conversion on the image information obtained by the image information obtaining unit 581 (step S107). In this case, the color conversion unit 587 convers the L*a*b* data into YMCK data by using a DLUT.

The image information output unit 588 outputs the YMCK data, which is the image information that has been subjected to color conversion, to the gradation correction unit 59 (step S108).

According to the exemplary embodiment described above in detail, color information (in this case, grid point data) that is necessary to perform color conversion processing may be extracted with higher accuracy. Thus, the hit ratio of the grid point data transferred to the cache memory 11b increases, and the processing speed of the color conversion processing is less likely to decrease.

In the above-described example, a cache memory is used as a second memory, but the exemplary embodiment is not limited thereto. For example, a shared memory may be used as the second memory.

In the above-described example, the resolution decreasing unit 582 decreases the resolution of image information. However, if color conversion processing is able to be performed at high speed without decreasing the resolution, the resolution is not necessarily decreased.

Furthermore, in the above-described example, the second color conversion unit 58 converts L*a*b* data in the L*a*b* color space into YMCK data in the YMCK color space. However, the color spaces before and after conversion are not particularly limited. For example, the color spaces before and after conversion may be the XYZ color space and the HSV color space.

Furthermore, in the above-described example, color conversion processing is performed as image processing, but the image processing is not limited thereto. For example, the exemplary embodiment is applicable to any image processing in which certain color information needs to be transferred to a second memory such as a cache memory.

Description of Program

The processing performed by the controller 50 is performed through cooperation between software and hardware resources.

Thus, the processing performed by the controller 50 may also be regarded as a program that causes a computer to implement an extraction function of extracting, on the basis of image information, pieces of color information having a high frequency of occurrence as color information that is necessary to perform image processing; a memory control function of causing the RAM 12 (first memory) to store a color information group including the pieces of color information extracted by the extraction function; and a transfer function of transferring the color information group from the RAM 12 (first memory) to the cache memory 11*b* (second memory), an access time of the cache memory 11*b* being shorter than an access time of the RAM 12.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
   an extraction unit, implemented by one or more processors, that extracts, on the basis of image information, pieces of color information having a high frequency of occurrence as color information that is necessary to perform image processing;
   a memory controller, implemented by the one or more processors, that rearranges the pieces of color information included in a color information group in order of lightness and causes a first memory to store a color information group including the pieces of color information extracted by the extraction unit; and
   a transfer unit, implemented by the one or more processors, that transfers the color information group from the first memory to a second memory, an access time of the second memory being shorter than an access time of the first memory,
   wherein the second memory stores correspondence information representing correspondence between the pieces of color information included in the color information group and address information representing addresses where the pieces of color information are stored.

2. The image processing apparatus according to claim 1, wherein the color information group includes the pieces of color information extracted by the extraction unit and pieces of color information generated by changing lightness of the extracted pieces of color information.

3. The image processing apparatus according to claim 1, further comprising:
   a resolution decreasing unit, implemented by the one or more processors, that decreases a resolution of the image information,
   wherein the extraction unit performs extraction on the basis of the image information whose resolution has been decreased by the resolution decreasing unit.

4. The image processing apparatus according to claim 1, wherein the pieces of color information are pieces of grid point data in a conversion table that is used for color conversion processing.

5. The image processing apparatus according to claim 1, wherein the transfer unit transfers the color information group to the second memory by using burst transfer.

6. The image processing apparatus according to claim 1, further comprising:
   a resolution decreasing unit, implemented by one or more processors, that decreases a resolution of the image information,
   wherein the grid points having the high frequency of occurrence being determined by linear interpolation using grid point data around the image information with the resolution decreased.

7. An image forming apparatus comprising:
   an image forming unit that forms an image on a recording medium; and
   an image processing unit, implemented by one or more processors, that performs image processing on image information that is to be used by the image forming unit to form an image,
   the image processing unit including
      an extraction unit, implemented by the one or more processors, that extracts, on the basis of the image information, pieces of color information having a high frequency of occurrence as color information that is necessary to perform the image processing,
      a memory controller, implemented by the one or more processors, that rearranges the pieces of color information included in a color information group in order of lightness and causes a first memory to store a color information group including the pieces of color information extracted by the extraction unit, and
      a transfer unit, implemented by the one or more processors, that transfers the color information group from the first memory to a second memory, an access time of the second memory being shorter than an access time of the first memory,
   wherein the second memory stores correspondence information representing correspondence between the pieces of color information included in the color information group and address information representing addresses where the pieces of color information are stored.

8. The image forming apparatus according to claim 7, further comprising:

a resolution decreasing unit, implemented by one or more processors, that decreases a resolution of the image information, wherein the grid points having the high frequency of occurrence being determined by linear interpolation using grid point data around the image information with the resolution decreased.

9. A non-transitory computer readable medium storing a program causing a computer to execute a process, the process comprising:

extracting, on the basis of image information, pieces of color information having a high frequency of occurrence as color information that is necessary to perform image processing;

rearranging the pieces of color information included in a color information group in order of lightness and causing a first memory to store a color information group including the extracted pieces of color information; and transferring the color information group from the first memory to a second memory, an access time of the second memory being shorter than an access time of the first memory;

wherein the second memory stores correspondence information representing correspondence between the pieces of color information included in the color information group and address information representing addresses where the pieces of color information are stored.

10. The non-transitory computer readable medium storing a program causing a computer to execute a process according to claim 9, the process further comprising:

decreasing a resolution of the image information, wherein the grid points having the high frequency of occurrence being determined by linear interpolation using grid point data around the image information with the resolution decreased.

* * * * *